F. B. CHARROIN.
COMBINED SOCKET AND HANDLE FOR AN AIR PRESSURE GAGE AND HOSE CONNECTOR.
APPLICATION FILED SEPT. 18, 1916.
1,239,769. Patented Sept. 11, 1917.
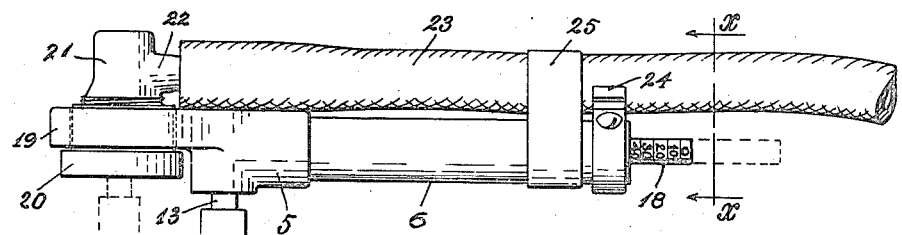
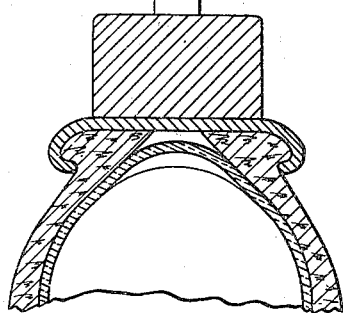
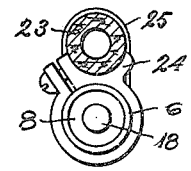
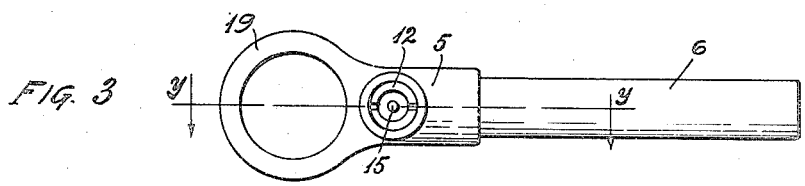
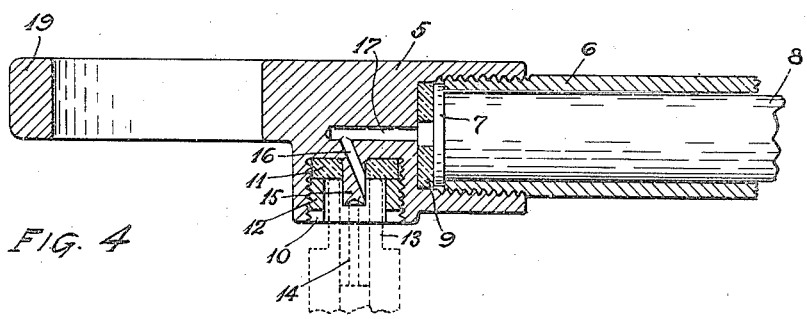
WITNESS
O. Johnson
INVENTOR
Frank B. Charroin
BY
C. D. Haskins
ATTORNEY

UNITED STATES PATENT OFFICE.

FRANK B. CHARROIN, OF SEATTLE, WASHINGTON.

COMBINED SOCKET AND HANDLE FOR AN AIR-PRESSURE GAGE AND HOSE CONNECTOR.

1,239,769.  Specification of Letters Patent.  Patented Sept. 11, 1917.

Application filed September 18, 1916. Serial No. 120,895.

*To all whom it may concern:*

Be it known that I, FRANK B. CHARROIN, citizen of the United States, residing at Seattle, in the county of King and State of Washington, have invented a certain new and useful Improvement in Combined Socket and Handle for Air-Pressure Gages and Hose-Connectors, of which the following is a specification.

My invention relates to improvements in combined socket and handle for an air-pressure gage and valve-controlled hose-connector, and the object of my invention is to provide means which shall be adapted to facilitate the manipulation of an air-pressure gage and a valve-controlled hose-connector associated therewith in the operation of ascertaining the degree of pressure of the air within the inner tube of a pneumatic tire of an automobile wheel, and of conducting air under pressure into said tube to inflate it to a desired degree.

A further object of my invention is to provide a socket within which may be secured an air-pressure gage, and to which is so attached a valve-controlled hose-connector and the delivery end portion of a hose, to which said valve-controlled hose-connector is connected, that said socket and said end portion of said hose may serve conjointly as a handle that may be manipulated quickly to engage, at desired different times, either the inlet passage-way of the air-pressure gage or the outlet passageway of the valve-controlled hose-connector with the check-valve-controlled nipple of the inner tube of the pneumatic tire of an automobile wheel in such manner that when such engagement is made said handle shall project outwardly from said nipple, thus to facilitate the manipulation of said handle.

I accomplish these objects by devices illustrated in the accompanying drawings wherein Figure 1 is a view in side elevation of a combined socket and handle embodying my invention in association with an air-pressure gage, a valve-controlled hose-connector and the nipple of the inner tube of a pneumatic tire; Fig. 2 is a sectional view on broken line $x$, $x$ of Fig. 1; Fig. 3 is a view of the bottom side of a socket forming an essential part of my invention, and Fig. 4 is an enlarged view of the same in vertical mid-section on broken line $y$, $y$ of Fig. 3.

Referring to the drawings, throughout which like reference numerals indicate like parts, 5 designates the body portion of a socket within one end portion of which is a screw-threaded recess within which is screwed the externally screw-threaded end portion of a tube 6 whose inner end surface engages with the annular surface of the flanged end 7 of an air-pressure gage 8 that is removably disposed in said tube 6, thus forcibly to engage said flanged end 7 against an annular soft rubber gasket 9 that is disposed against the end wall of said screw-threaded recess, as shown more clearly in Fig. 4, thereby to hold said air-pressure gage 8 in its position within the socket formed by the body portion 5 and the tube 6, and to make an airtight joint between the passageway through the gasket 9 and the passageway through the wall of the flanged end 7 by which air gains access to the interior of said air-pressure gage 8.

On the bottom side of the body portion 5 is a boss within which is formed an annular recess 10 within the innermost portion of which is an annular gasket 11 of soft rubber which is held in its position by an externally screw-threaded annular bushing 12 whose internal diameter adapts it to permit the entrance of the check-valve-controlled nipple 13 of the inner tube of a pneumatic tire to engage its end surface with the soft rubber gasket 11, as indicated in Fig. 4, where said nipple 13 and its valve-stem 14 are shown by dotted lines.

The boss 15 which projects outwardly through the gasket 11 serves in a well known manner to engage with the valve-stem 14 of said nipple 13 to open the check-valve of said nipple 13 when said gasket 11 is forced against the end surface of said nipple; and said boss 15 is provided with a hole 16 that forms an air passageway that extends obliquely upward from one side of its outer end portion into an air passageway 17 that leads into the passageway through the gasket 9 and flanged end 7, whereby air may find its way from the nipple 13 into the air-pressure gage 8 to cause said gage 8, in a well known manner, to indicate the degree of pressure within the inner tube, to which said nipple 13 may be attached, by forcing a graduated indicating member 18 to move outwardly from the air-pressure gage 8 as indicated in Fig. 1.

Thus, the socket comprising the body portion 5 and the tube 6 may serve to hold an air-pressure gage in such manner that, during the operation of measuring the air-pressure in the inner tube of an automobile wheel, such air-pressure gage will extend outwardly from the nipple of said inner tube instead of inconveniently extending directly from said nipple toward the hub of said wheel to a point where the adjacent spokes of said wheel are near each other.

On that end of the body portion 5 opposite the tube 6 is an integral collar 19 whose axis is at a right angle to the axis of the tube 6, and disposed to fit within and to extend through said collar 19 is the internally screw-threaded portion of a flanged clamping collar 20 which is screwed on to the delivery end of the body portion 21 of a well known form of valve-controlled hose-connector, the flange of which collar 20 serves to aid in maintaining said valve-controlled hose-connector in a fixed position with relation to the body portion 5 and tube 6.

Extending from the body portion 21 is an integral inlet nipple 22 disposed with its axis parallel with the axis of the tube 6, and attached to said inlet nipple is the delivery end portion of a hose 23 that is disposed adjacent to and parallel with the tube 6 to rest in a saddle 24 that is secured to the outer end portion of the tube 6 in which position said end portion of said hose 23 is fastened by a binding band 25 of suitable material, as adhesive tape or a band of sheet metal, said hose 23 being connected with a source of compressed air not shown.

Obviously, changes may be made in the forms and dimensions of the tube 6 and the body portion 5 to suit air-pressure gages and valve-controlled hose-connectors of different sizes without departing from the spirit of my invention.

What I claim is:

1. A combined socket and handle of the class described, comprising a body portion which is provided with a hole that forms a circular recess in one of its end portions, and further provided with an annular recess in one of its side portions, said recesses being disposed with their axes at right angles to each other and connected by an air passageway extending therebetween, said annular recess being adapted to connect with and to operate the check-valve-controlled nipple of the inner tube of a pneumatic tire; a section of tube which is adapted to surround an air pressure gage and releasably to fasten the inlet end of said gage within the circular recess in the end portion of said body portion, whereby air may pass from said passageway into said gage; and means associated with said body portion and with said tube whereby there may be fastened thereto and parallel therewith the inlet nipple of a hose connector and an end portion of the hose to which said inlet nipple is connected.

2. A combined socket and handle of the class described, comprising a body portion which is provided with a hole that forms a circular recess in one of its end portions, and further provided with an annular recess in one of its side portions, said recesses being disposed with their axes at right angles to each other and connected by an air passageway extending therebetween, said annular recess being adapted to connect with and to operate the check-valve-controlled nipple of the inner tube of a pneumatic tire; a section of tube which is adapted to surround an air pressure gage and releasably to fasten the inlet end of said gage within the circular recess in the end portion of said body portion, whereby air may pass from said air passageway into said gage; and means associated with said body portion and with said tube whereby there may be fastened thereto and parallel therewith the inlet nipple of a hose connector.

3. A combined socket and handle of the class described, comprising a body portion which is provided with a hole that forms a circular recess in one of its end portions, and further provided with an annular recess in one of its side portions, said recesses being disposed with their axes at right angles to each other and connected by an air passageway, said annular recess being adapted to connect with and to operate the check-valve-controlled nipple of the inner tube of a pneumatic tire; a tube one end portion of which is disposed within the said circular recess; and a pressure gage releasably fastened within said tube so that air may pass from said air passageway into said gage.

4. A gage comprising a body portion which is provided with a hole that forms a circular recess in one of its end portions; a gage tube one end portion of which is disposed within said circular recess; a hose connector associated with said body portion; and an end portion of a hose connected to one end of said hose connector and to the side portion of said tube so that said end portion of said hose will be parallel with said tube.

In witness whereof, I, hereunto subscribe my name this 12th day of September, A. D. 1916.

FRANK B. CHARROIN.

Witnesses:
FRANK WARREN,
O. JOHNSON.